United States Patent [19]

Kime et al.

[11] 4,094,513
[45] June 13, 1978

[54] FULLY CARTRIDGE AGITATOR SEAL FOR USE WITH GLASS LINED MIXER TANKS

[75] Inventors: Donald L. Kime, Vandalia; Ronald G. Stogdill, Trotwood, both of Ohio

[73] Assignee: Chemineer, Inc., Dayton, Ohio

[21] Appl. No.: 722,809

[22] Filed: Sep. 13, 1976

[51] Int. Cl.² .................................................. F16J 15/34
[52] U.S. Cl. ........................................... 277/41; 277/62
[58] Field of Search .................................. 277/38–43, 277/61, 62

[56] References Cited

U.S. PATENT DOCUMENTS

| 2,606,045 | 8/1952 | Porges | 277/62 |
| 2,836,440 | 5/1958 | Brumagim | 277/62 |
| 3,582,089 | 6/1971 | Amorese | 277/61 |
| 3,675,933 | 7/1972 | Nappe | 277/38 |
| 3,743,302 | 7/1973 | Bach | 277/38 |
| 3,782,739 | 1/1974 | Kahanek | 277/74 |
| 3,941,395 | 3/1976 | Ball | 277/41 |

Primary Examiner—Robert I. Smith
Attorney, Agent, or Firm—Biebel, French & Nauman

[57] ABSTRACT

A mechanical seal and rotating agitator shaft assembly for effecting sealing between the shaft and the wall of the opening through which it extends into a mixer tank includes a sleeve dimensioned for removable mounting on the shaft and serving as a support for the rotating seal assembly which includes a sealing ring arranged for sealing against a glass coated portion of the shaft to prevent access of the contents of the tank to any metal part of the seal and shaft assembly. In the preferred embodiment, the shaft includes a glass coated boss located below the sleeve for engagement by the sealing ring.

6 Claims, 3 Drawing Figures

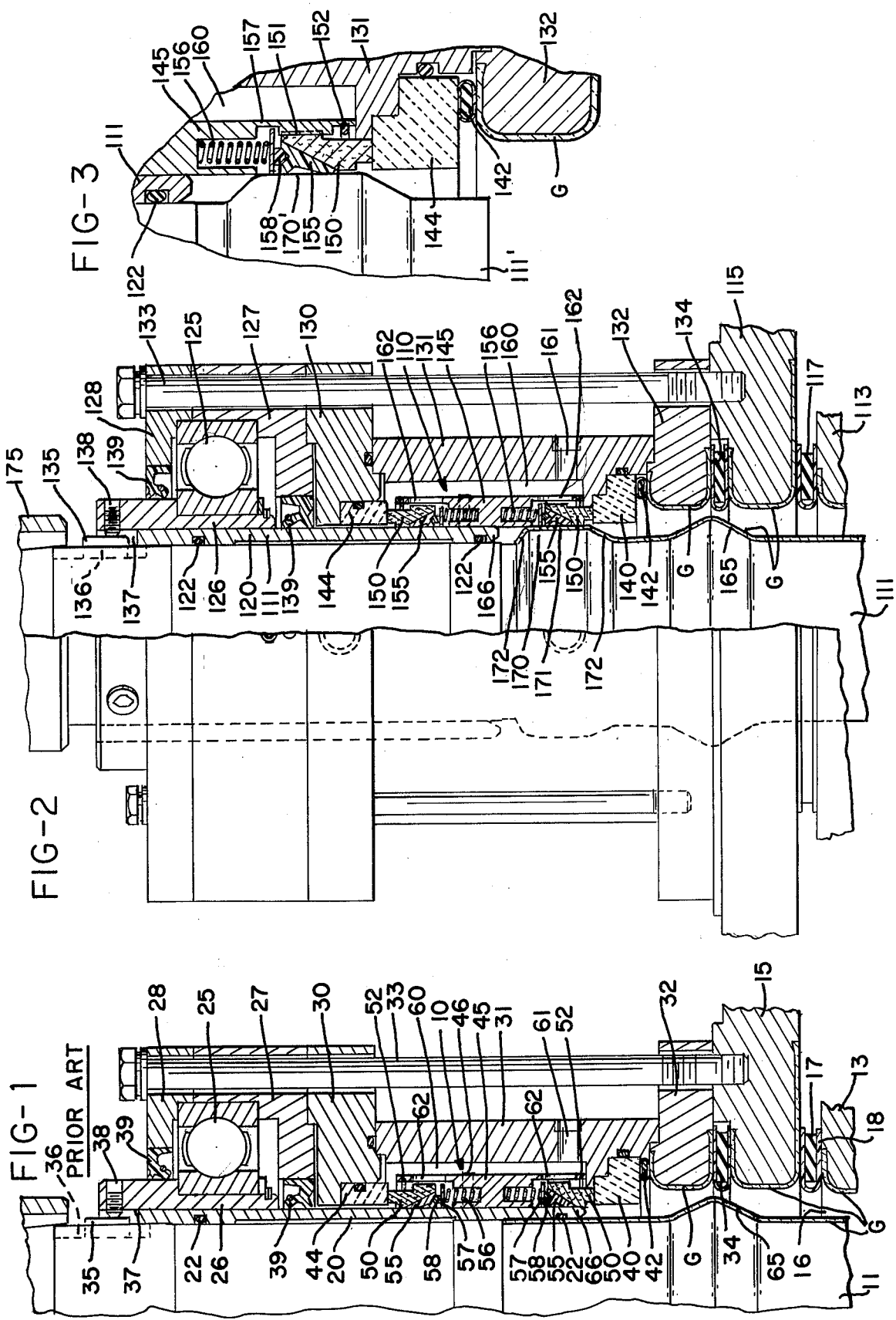

FULLY CARTRIDGE AGITATOR SEAL FOR USE WITH GLASS LINED MIXER TANKS

BACKGROUND OF THE INVENTION

This invention relates to seals for rotating shafts, and more particularly to seal assemblies especially adapted for sealing glass coated agitator shafts to mixer tanks handling corrosive materials.

FIG. 1 and U.S. Pat. No. 3,877,706 illustrate seals which have been developed for mixers handling corrosive materials. Many such mixers have glass lined tanks and glass coated agitator shafts to resist corrosive attack. Since the gap between the agitator shaft and the opening for it into the tank must be closed, especially when mixing is done under pressure, a rotatable carbon seal is commonly used which moves with the agitator shaft and slides and seals against the polished face of a substantially non-metallic (e.g., ceramic) stationary seal. Prior art seals using this approach have satisfactorily closed and sealed the gap between the agitator shaft and the mixer tank without exposing metallic seal members to corrosive materials within the tank.

Generally, however, such prior art devices have been of the type requiring assembly directly onto the agitator shaft at the application site. Such assembly is a time-consuming process since the seals must be carefully adjusted so that the springs which bias the moving carbon seal against the stationary ceramic seal will provide a proper, uniform sealing pressure. The seal is then pressure tested for leakage, prior to returning to service. During such periods of assembly and adjustment, the mixer is necessarily shut down, sometimes for several days, causing substantial lost production.

"Cartridge" seals have therefore been developed to reduce equipment down time. These permit the seal components to be preassembled and adjusted prior to attachment to the agitator shaft and the mixer. For example, the above-noted U.S. Pat. No. 3,877,706 shows a seal in which the central core, carrying the moving carbon and stationary seal members, may be extracted as a unit from the seal housing by lifting it vertically along and beyond the end of the agitator shaft and slipping a new core down onto the shaft and back into the seal housing.

Fully cartridge bench testable mechanical seals are also available for relatively less corrosive environments, such as the example shown in FIG. 1, wherein the entire seal, including the seal housing, is removable from the shaft by sliding it along and of the end of the shaft. Such a structure is known as a "fully cartridge" seal since the entire unit may be changed as a single, "fully" cartridge system, and it differs in this respect from the construction of U.S. Pat. No. 3,877,706 which is not truly a cartridge seal since only part of the seal is removed for servicing. In order to explain the advantage provided by the present invention over the structure of FIG. 1, the latter will now be described.

In FIG. 1, the seal assembly indicated generally as 10 supports the shaft 11 in depending relation into the tank shown fragmentarily at 13. The seal assembly 10 is supported by an annular base plate 15 which is clamped or otherwise secured on tank 13 in aligned relation with the opening 16 through which the shaft 11 extends. The junction between plate 15 and tank 13 is sealed by a gasket 17 which is preferably provided with a corrosion-resistant jacket 18 of Teflon or the like, and the surfaces of the tank wall 13 and plate 15 exposed to the contents of the tank are shown as having a glass coating or lining G.

The seal assembly 10 includes a sleeve 20 sealed on the outside of shaft 11 by O-rings 22, and the sleeve 20 is proportioned to extend down below the upper end of the glass coating G on the shaft so that the lower O-ring 22 seals against this coating. The upper end of the sleeve 20 is supported by a ball bearing 25 in inner and outer housings 26 and 27 provided with a top cap 28. This bearing assembly is supported by the top plate 30 of the seal housing, which is in turn supported by the cylindrical seal housing 31 and bottom seal housing plate 32 on the plate 15 by means of bolts 33 and gasket 34.

The inner bearing housing 26 has a slip fit relation with sleeve 20 for ready assembly and disassembly purposes, but both it and the sleeve are secured for rotation with shaft 11 by a key 35 held in a slot 36 in shaft 11 and a slot 37 in sleeve 20 by a set screw 38. Sealing rings 39 between housing members 26 and 28 and between sleeve 20 and housing member 27 retain grease within the bearing assembly.

A stationary seal 40 of ceramic or other suitable material is mounted in the lower end of seal housing 31, and a gasket 42 seals the junction between seal 40 and plate 32. A second stationary seal 44 is similarly mounted in the top plate 30 of the seal housing. The seal 44 and the top plate 30 are proportioned to provide free running clearance for the sleeve 20.

The opposed pair of rotating seals which complement stationary seals 40 and 44 are carried by a seal retainer 45 proportioned for slip fitting on the sleeve 20 and secured thereto by one or more set screws 46. Each rotating carbon seal 50 is mounted loosely in one or the other end of retainer 45 with a loosely keyed connection thereto (shown at 151 in FIG. 3), and it is held against accidental removal from retainer 45 by a snap ring 52. Each seal 50 has a frustoconical inner surface mating with the complementary outer surface of a wedge ring 55 of a Teflon or the like to cam the ring 55 into sealing engagement with the sleeve 20.

Each wedge ring 55 is lightly biased by springs 56 through an annular disk 57 and an O-ring 58 to urge the seals 50 to sealing relation with their associated stationary seals 40 and 44. In operation, the space 60 surrounding seal retainer 45 is pressurized with sealant through the inlet 61 to force the seals 50 and wedge rings 55 to sealing positions, the retainer 45 having openings 62 for admitting the pressure fluid to the interior of retainer 45 to exert pressure on the seals and wedge rings.

The fully cartridge seal of FIG. 1 can be mounted on sleeve 20 and adjusted and bench tested prior to assembly on the agitator shaft by pressurizing the seal housing and checking for leakage. Seal assemblies passing this test can then be stored until needed, and can then be put into service quickly as a unit replacing the seal and bearing assembly which is removed from service. The boss 65 on shaft 11 is used during replacement of the seal assembly for temporarily supporting the shaft and agitator within the tank, in known manner.

The fully cartridge seal shown in FIG. 1 offers substantial advantages over other prior art constructions such as that shown in U.S. Pat. No. 3,877,706, but it has one potential weakness in that the nose portion 66 at the lower end of sleeve 20 is exposed to the contents of the tank 13, which is undesirable if the contents are corrosive. Attempts have been made to overcome this potential problem by coating the nose of the sleeve with glass, but this is expensive and also requires that the relatively thin and flexible sleeve be handled with care to avoid cracking the glass coating.

Another solution to the problem of sleeve corrosion is provided in U.S. Pat. No. 3,877,706, wherein the sleeve is effectively shifted to a position outside the seal members, but this has disadvantages. Because interior sleeves have become generally standard in the industry, standard sized carbon seal units for use therewith are available from many manufacturers, and special seal assemblies are required if some other sleeve arrangement is used. Further, an interior sleeve, as in FIG. 1, can support the seal during bench testing, but if an exterior sleeve is used, the sleeve must be supported by the agitator shaft when the sealant space is pressurized for testing, and the seal must therefore be disassembled after testing and cannot be put in service as a preassembled unit.

A need therefore remains for a fully cartridge, fully bench testable, corrosion resistant mechanical seal particularly adapted for rotatably sealing a glass lined agitator shaft to a mixer tank and which exposes only nonmetallic parts to the potentially corrosive contents of the tank. Such a seal would provide maximum service life, maximum resistance against attack and deterioration, maximum convenience in preparation and assembly of the seal, maximum convenience in assembly onto the agitator shaft and mixer tank, and minimum loss of production time.

SUMMARY OF THE INVENTION

Briefly, the present invention meets the above requirements by shortening the sleeve member of the seal assembly to a position substantially above the lower rotatable carbon seal. The sleeve still supports the carbon seal since it is also carried in a seal retainer attached to the sleeve. However, shortening the sleeve makes it possible to enlarge the agitator shaft with a boss which projects radially into the space left by the shortened sleeve. If the boss is proportioned to increase the effective diameter of the shaft adjacent the rotatable seal to match the outer diameter of the sleeve, a wedge ring of the same size used to seal against the sleeve will engage the boss for sealing engagement therebetween. Alternatively, a smaller boss, or no boss, may be provided, in which case a wedge ring of smaller inner diameter is used.

The surface of the agitator shaft on and immediately adjacent the boss has surface contours which are curved on radii of at least 3/16 inch. This makes it possible to coat the shaft with glass up to and around this boss so that the opening between the shaft and the tank is entirely closed by non-metallic materials. The advantages provided by the prior art device shown in FIG. 1 are therefore completely preserved, and no metallic components are now exposed to corrosion.

It is therefore an object of the present invention to provide a fully cartridge, corrosion resistant mechanical seal assembly which is particularly adapted for rotatably sealing a glass coated agitator shaft to a mixer tank, which exposes only non-metallic parts to the contents of the tank, which can be fully assembled remotely from the agitator shaft, which can be fully bench tested prior to assembly onto the agitator shaft and mixer tank, which can be rapidly removed, exchanged, and reattached to the agitator shaft and mixer tank for minimum production down time, which provides an agitator shaft configuration fully compatible with the use of a glass coating thereon, which can use standardized, readily available components for those which require regular replacement, and to accomplish these objects and purposes in an uncomplicated, inexpensive, durable and reliable configuration readily suited for a full range of mixer applications.

Other objects and advantages of the invention will be apparent from the following description, the accompanying drawings and the appended claims.

BRIEF DESCRIPTION OF THE DRAWINGS

FIG. 1 is a fragmentary, cross-sectional view of a prior art fully cartridge mechanical seal attached to an agitator shaft and mixer tank;

FIG. 2 is a partially sectioned view of a fully cartridge seal and shaft assembly according to the present invention; and FIG. 3 is an enlarged detail of the seal assembly of FIG. 2 illustrating the bench testing thereof.

DESCRIPTION OF THE PREFERRED EMBODIMENT

Most of the components of the seal and bearing assemblies and the tanks are the same in both of FIGS. 1 and 2, and like reference characters are therefore used for those parts common to both figures except that those in FIGS. 2 and 3 are in the 100 series, i.e., seal assembly 110, shaft 111, etc., and only those parts which are different in FIGS. 2 and 3 need be described.

The sleeve 120 in FIG. 2 is substantially shorter than sleeve 20 but it is otherwise similarly constructed and supported. The shaft 111 also differs from shaft 11 in that in the space between the nose portion 166 of sleeve 120 and the boss 165, the shaft is formed with a second boss 170 which includes a cylindrical surface 171 and frustoconical end shoulders 172 over which the glass coating G extends.

The glass coated surface 171 is preferably of the same diameter as the outer diameter of sleeve 120, so that with all parts of the seal assembly 110 of the same respective sizes as in the seal assembly of FIG. 1, the wedge ring 155 which cooperates with the lower rotating seal 150 will seal against the shaft boss surface 171 rather than the surface of the sleeve as in FIG. 1. This lower wedge ring arrangement provides an effective seal for preventing the contents of tank 113 from access to the lower end and nose portion 166 of sleeve 120 corresponding to the portion of sleeve 20 which is below the lower wedge ring 55 in FIG. 1 and therefore exposed to the contents of the tank, and it also similarly protects the metal portions of the retainer 145 and associated parts which depend below sleeve nose 166.

The seal assembly of FIGS. 2 and 3 provides substantial practical advantages over the construction of FIG. 1 and all other prior constructions known to applicant. It has all the advantages of preassembly and testing as a unit as the construction of FIG. 1 while also assuring that no metal parts will be exposed to potentially corrosive contents within the tank. Also, as best seen in FIG. 3, the bos 170 is formed with simple surface contours which do not require fine detailed machining, and are readily curved on radii of at least 3/16 inch which is the preferred minimum for satisfactory reception and retention of the glass lining G. It is relatively easy with this construction to provide a glass coating no thicker than the .080 inch which has been found to be a practical maximum for assurance against cracking in normal use.

As with the prior art seal assembly 10 in FIG. 1, the seal assembly 110 is fully cartridge for removal from shaft 111 as a complete unit. This is done in the same way as in FIG. 1, by removing the upper portions of the drive assembly, shown as tapered coupling section 175, removing bolts 133, and then lifting the shaft and seal assembly sufficiently to insert a conventional temporary holding device under the boss 165. Each set screw 138 is then loosened, the key 135 is removed, and the entire unit can be lifted off the shaft 111. Although sleeve 120 is shorter than the prior art sleeve 20, the lower rotatable seal assembly is retained between the lower stationary seal 140 and the retainer 145 for removal as a portion of this unit.

Proportioning the sleeve 120 and shaft boss surface 171 with the same diameters makes it possible to use rotating seals 150 and wedge rings 155 of the same size for both the upper and lower seals interchangeably. The boss 170 could be of a different diameter, so long as it is not less than the inner diameter of the sleeve 120, but this would necessitate the use of different sized upper and lower rotating seals and wedge rings.

Bench testing of the seal assembly 110 is accomplished in the same way as described in connection with FIG. 1, but with one exception. Since the sleeve 120 terminates above the lower rotary seal assembly, it is necessary to use a dummy shaft or plug of the same dimensions as a portion of shaft 111 including the boss 170, and this is illustrated in FIG. 3 by the dummy shaft 111' and its boss portion 170'. With the dummy shaft or plug in place, it is possible to pressurize the space 160 with sealant through the port 161 to check for leakage past any of the seals. Seal assemblies which pass this test can then be stored ready for use as replacements as already described in connection with FIG. 1.

As may be seen, therefore, the present invention provides numerous advantages. Principally, it provides a single structure having all the desirable features generally available only separately in the prior art. The invention thus provides a single seal assembly which is fully cartridge, which uses standardized replacement components, which is fully bench testable prior to assembly onto the agitator shaft, and which exposes only non-metallic parts to potentially corrosive contents of the mixer tank. The invention thus provides maximum convenience in use, maximum durability, and minimum down time when servicing and/or replacement are required.

While the form of apparatus herein described constitutes a preferred embodiment of this invention, it is to be understood that the invention is not limited to this precise form of apparatus, and that changes may be made therein without departing from the scope of the invention.

What is claimed is:

1. A fully cartridge, corrosion-resistant seal and agitator shaft assembly for use on mixer tanks particularly adapted for effecting sealing between an agitator shaft and the wall defining the opening through which the shaft extends into the mixer tank, said seal and shaft being free of any metal surface exposed to the contents of the tank, comprising:
   a. a stationary, vertically elongated annular seal housing mounted on the tank defining an opening which opens into the tank,
   b. an agitator shaft extending through said housing into said tank,
   c. bearing means supporting said shaft for rotation within said housing,
   d. a sleeve within said housing mounted at a predetermined axial position on the agitator shaft and fixed thereto for direct rotation therewith,
   e. upper and lower annular seal rings secured in stationary relation in said housing,
   f. a seal retainer secured to said sleeve for direct rotation therewith and enclosed within said housing between said stationary seal rings
   g. upper and lower rotary seal assemblies carried by said retainer for direct rotation therewith and each including a rotary annular seal member having a non-metallic surface positioned for running sealing engagement with the adjacent said stationary seal ring,
   h. said sleeve proportioned to terminate at the lower end thereof at a position axially intermediate said seal assemblies within said housing,
   i. the upper said seal member having an inside surface adapted to form a fluid seal with the outer surface of said sleeve,
   j. said shaft having a corrosion resistant coating thereon extending from a position axially above said lower seal assembly into said tank, and
   k. said non-metallic surface of said annular seal member of said lower seal assembly being proportioned to form a fluid seal directly against said shaft on the coated surface thereof to prevent access of the contents of the tank to said sleeve.

2. A shaft and seal assembly as defined in claim 1 wherein said shaft includes a boss portion located below the lower end of said sleeve in position for engagement by said lower seal member.

3. A shaft and seal assembly as defined in claim 2 wherein said boss is of substantially the same diameter as the outer diameter of said sleeve for sealing engagement with a lower said seal member of the same size as the upper said seal member.

4. A shaft and seal assembly as defined in claim 2 wherein said boss has surface contours curved on radii of at least 3/16 inch for receiving and retaining a glass coating with minimal danger of cracking such coating.

5. A shaft and seal assembly as defined in claim 3 wherein said boss has surface contours curved on radii of at least 3/16 inch for receiving and retaining a glass coating with minimal danger of cracking such coating.

6. A fully cartridge, corrosion-resistant mechanical seal particularly adapted for rotatably sealing an agitator shaft having a corrosion resistant lining to a mixer tank at a shaft entry opening in the tank, the seal closing the opening between the agitator shaft and the tank and exposing only non-metallic parts to potentially corrosive contents within the tank; the seal including a stationary housing having a first end attachable to the tank around the shaft entry opening therein, a sleeve within the housing dimensions for fitting over the outside of the shaft and being fixed thereto for direct rotation therewith, a seal retainer attached to the sleeve for direct rotation therewith within the housing, and a stationary annular seal ring having a non-metallic surface and being supported on the interior of the housing substantially at the end adjacent the tank to surround the shaft along a lined portion thereof and to close part of the opening between the shaft and the housing; the improvement comprising:
   a. the sleeve being proportioned to terminate at an end at a predetermined axial distance from the first housing end, said predetermined distance being greater than the distance between the stationary seal and the first housing end, and b. a rotatable annular seal member carried on the seal retainer for direct rotation therewith and having a non-metallic surface portion located in the opening between said sleeve end and the stationary seal ring, said non-metallic surface portion of said rotatable seal member being sealed against the lining on the agitator shaft between said sleeve and the first housing end, and being supported by the seal retainer in slideable, sealing engagement with the stationary seal ring for closing the opening between the stationary seal ring and the agitator shaft.

* * * * *

UNITED STATES PATENT AND TRADEMARK OFFICE
CERTIFICATE OF CORRECTION

PATENT NO. : 4,094,513
DATED : June 13, 1978
INVENTOR(S) : Donald L. Kime & Ronald G. Stogdill It is certified that error appears in the above-identified patent and that said Letters Patent are hereby corrected as shown below:

Column 1, line 50, "of" should be --off--.

Column 2, line 63, there should be a space between the words "has" and "one".

Column 4, line 59, "bos" should be --boss--.

Column 6, line 8, there should be a comma after "rings".

Column 6, line 56, "dimensions" should be --dimensioned--.

Signed and Sealed this

Second Day of January 1979

[SEAL]

Attest:

RUTH C. MASON
Attesting Officer

DONALD W. BANNER
Commissioner of Patents and Trademarks